J. HODGKINSON.
METHOD OF PRECIPITATING SALT.
APPLICATION FILED APR. 1, 1910. RENEWED JAN. 18, 1913.
1,065,128.
Patented June 17, 1913.
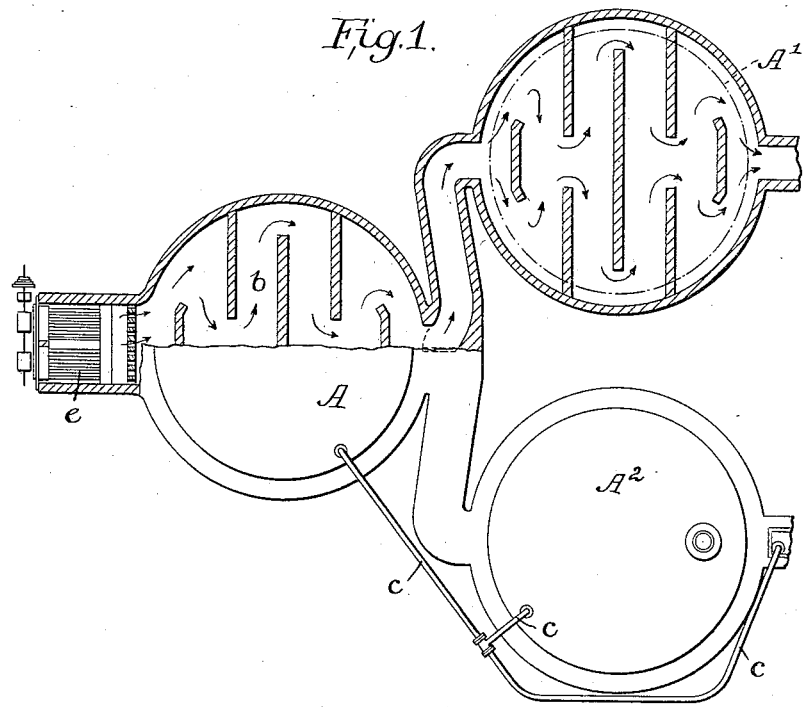
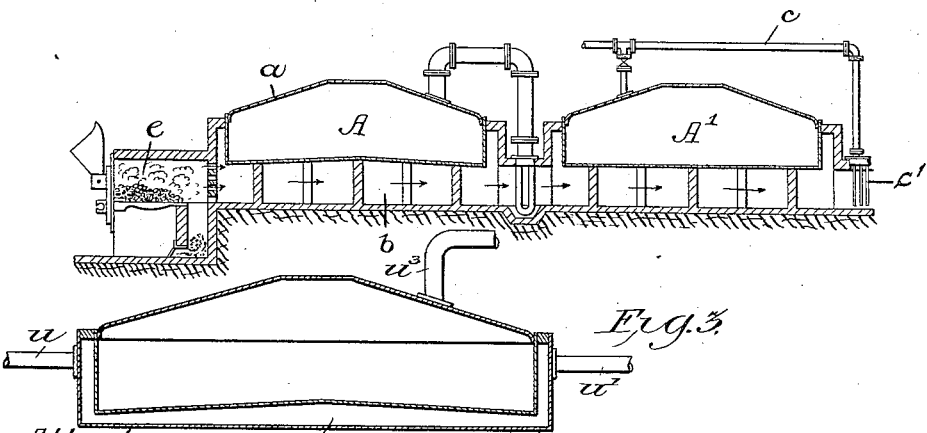

UNITED STATES PATENT OFFICE.

JAMES HODGKINSON, OF MANCHESTER, ENGLAND, ASSIGNOR TO JAMES FRANCIS SEACOMBE, OF EAST HAM, ESSEX, ENGLAND.

METHOD OF PRECIPITATING SALT.

1,065,128.        Specification of Letters Patent.      Patented June 17, 1913.

Application filed April 1, 1910, Serial No. 552,933. Renewed January 18, 1913. Serial No. 742,977.

*To all whom it may concern:*

Be it known that I, JAMES HODGKINSON, a subject of the King of Great Britain, and resident of Manchester, county of Lancaster, England, have invented certain new and useful Improvements in New and Improved Methods of Precipitating Salt, of which the following is a specification.

My invention hereinafter described relates to the evaporation of brine for the production of common salt, by heat artificially applied. Heretofore this evaporation has largely been produced by what is called the vacuum system, which is effective but expensive by reason of the complication and cost of the plant, and also by reason of the cost of the fuel required.

In the manufacture of salt by evaporation I have found that it is essential for the production of fine salt, such as that required for table use, to heat the brine to a very high temperature, since the fineness of the crystals depends upon the high temperature. Further, and because the size of the crystals depends upon the temperature, it is essential for uniformity of size of crystals, that there should be uniformity of temperature in the heat applied to the evaporating pan, and this heat should not vary more than two or three degrees during the process of production of a given amount or charge. This uniformity of heat applied to the evaporating pans may be approximated by the use of steam, but this requires apparatus for the generation of steam, which is merely, in this case, a conveyer of heat, with the waste of coal incident always to the generation of steam. Furthermore, it is desirable to produce different grades of salt of uniform grain, without grinding, and this I have accomplished by subjecting successive pans to a relatively high and uniformly maintained heat, though lower than that maintained in the primary pan. I have accomplished all these desired results in my invention by a simple process which involves only a simple apparatus and a greatly lessened expenditure of fuel.

The essential point in my said invention therefore is the application of a closely and uniformly regulated high heat to the evaporating pans, which contain an amount of brine held therein and subjected to this uniform heat during the process of crystallization. I use, as a preferred means for generating this heat, a furnace fed by a stoker, such as that shown in my United States patent of October 29/07, #869708, this furnace consuming coal fed in regulated quantities and without material variation in the heat generated. It is arranged in such relation to the first pan as to give its full heat thereto and to raise the heat of the first pan as high as 1800° F., this temperature being sometimes used in actual practice. To have practical and economical use, the heat of the products of combustion is further utilized by being conveyed to other pans arranged in succession, the heat thus applied to the successive pans being of course diminished regularly but still remaining uniform for each pan to which it is applied and by this method different grades of salt varying in the size of the crystals, such as butter salt and fish salt are produced by the heat of the same furnace. In order to secure a high heat, however, in the first pan it is necessary that this pan should be covered, steam being led from it under proper regulation, and utilized to heat the next pan in order, if desired, or for other purposes. The second pan may have a false bottom or jacket forming a steam chamber through which the steam from the first pan is conducted. Preferably, as hereinafter shown, this steam chamber occupies the bottom of the second pan and a part of the side wall. The second pan or pans therefore may receive the heat of the products of combustion which have passed the first pan and also the steam from the first pan so that the whole of the heat is utilized. I may have one or more secondary pans and may continue the operation of utilizing the heat of the products of combustion with or without the steam by extending the series to other pans either closed or open. I thus obtain in the first pan with its uniformly maintained, high heat, the finest grade of salt, useful for table salt and the like without grinding, a thing never before accomplished so far as I am aware, and in the succeeding pans coarser and still coarser grades of salt, all these grades being uniform because of the uniform heat applied to each pan, thus preventing precipitation of crystals of irregular size.

In order that the method may be better understood, I show in the accompanying drawings enough of the apparatus disclosed in a former application for this purpose.

In these drawings, Figure 1 is an entire diagrammatic plan showing the primary and secondary pans and the heating means. Fig. 2 shows a longitudinal section following the construction of the plant shown in Fig. 1. Fig. 3 shows, detached, a pan having a false bottom or jacket forming a steam chamber.

In this apparatus is a primary pan A closed as shown at $a$, and provided with suitable means for supplying brine thereto. This pan is suitably set in brick work and has flue passages for the products of combustion underneath, preferably with baffles. I prefer to first heat the brine and then pass it through coils $c'$ which are in the path of the products of combustion, and from these coils the brine passes to the pans through pipe $c$. The products of combustion as shown in Figs. 1 and 2 pass directly from the furnace $e$ underneath the first pan and from thence to pans $A'$, $A^2$, and after leaving these pans may pass beneath other pans either closed or open. Dampers or valves divert a part or the whole of the flue gases from the primary to either of the secondary pans or allow an equal flow of heat to each.

The number of pans is not material but it is desirable in the interest of economy of fuel to utilize all the heat units in the products of combustion.

I find it preferable to maintain the heat of the first pan not lower than 1000° F., but I do not limit myself as to the ranges of temperature excepting that the temperature must be practically uniform at each stage to secure a uniform product and must be abnormally high in the first pan to obtain crystals of such fineness as to be used as table salt without subsequent grinding. By abnormal heat I mean a temperature between 1000° F. and 1800° F. but whatever the temperature is at the beginning it must be kept uniform throughout the operation.

Figs. 1 and 2 show the pans heated by the products of combustion from furnace $e$ but in Fig. 3 I conduct the steam generated in the first pan to the secondary pans which are provided with a jacketed evaporator, and in such case the steam would enter at $u$ and leave at $u'$, $u^2$ being a drainage outlet. The steam generated within the evaporator would pass through outlet pipe $u^3$ to be utilized as might be desired.

What I claim as my invention is:—

1. The method herein described of producing a fine quality of salt by direct precipitation and without grinding, consisting in subjecting the brine in a closed pan to an abnormally high temperature uniformly maintained, substantially as described.

2. The herein described method of evaporating brine to form salt, consisting in subjecting the brine in a closed pan to an abnormally high temperature uniformly maintained, and in conducting the heat from the first pan to a second pan and maintaining the heat at a uniform high temperature but lower than that in the first pan so as to obtain a precipitation of crystals of a different grade from that in the first pan, substantially as described.

3. The herein described method of evaporating brine to form salt consisting in subjecting the brine in a closed pan to the products of combustion of a uniformly regulated furnace, and in conducting the products of combustion and the steam of the first pan to a second pan or pans, substantially as described.

4. The method herein described of treating brine for the production of salt consisting in subjecting the brine held in a series of closed pans to the products of combustion of a uniformly regulated furnace applied to the series in succession and in conducting the steam from the closed pans in succession from each to the next throughout the series, substantially as described.

In testimony whereof, I affix my signature in presence of two witnesses.

JAMES HODGKINSON.

Witnesses:
BENNETT S. JONES,
FRANK I. DANFORD.